US012574607B2

(12) United States Patent
Agarwal et al.

(10) Patent No.: US 12,574,607 B2
(45) Date of Patent: Mar. 10, 2026

(54) SYSTEMS AND METHODS FOR PROVIDING BINGE-WATCHING PAUSE POSITION RECOMMENDATIONS

(71) Applicant: Adeia Guides Inc., San Jose, CA (US)

(72) Inventors: Vineet Agarwal, Andover, MA (US); Abhijit Satchidanand Savarkar, Andover, MA (US); Abubakkar Siddiq, Methuen, MA (US)

(73) Assignee: Adeia Guides Inc., San Jose, CA (US)

( * ) Notice: Subject to any disclaimer, the term of this patent is extended or adjusted under 35 U.S.C. 154(b) by 50 days.

(21) Appl. No.: 18/641,722

(22) Filed: Apr. 22, 2024

(65) Prior Publication Data

US 2024/0430540 A1     Dec. 26, 2024

Related U.S. Application Data

(63) Continuation of application No. 16/503,008, filed on Jul. 3, 2019, now Pat. No. 11,997,361, which is a
(Continued)

(51) Int. Cl.
*H04N 21/488*     (2011.01)
*H04N 21/25*     (2011.01)
(Continued)

(52) U.S. Cl.
CPC ....... *H04N 21/4882* (2013.01); *H04N 21/252* (2013.01); *H04N 21/25891* (2013.01);
(Continued)

(58) Field of Classification Search
CPC ......... H04N 21/4532; H04N 21/44204; H04N 21/25891; H04N 21/47217; H04N 21/4668; H04N 21/4667; H04N 21/4882
See application file for complete search history.

(56) References Cited

U.S. PATENT DOCUMENTS 6,239,794 B1     5/2001   Yuen et al.
6,564,378 B1     5/2003   Satterfield et al.
(Continued)

FOREIGN PATENT DOCUMENTS

JP     2013175862 A     9/2013
JP     2017529638 A     10/2017
(Continued)

OTHER PUBLICATIONS

PCT International Search Report for International Application No. PCT/US2018/059804, mailed Jan. 23, 2019 (17 Pages).

*Primary Examiner* — Jason Salce
(74) *Attorney, Agent, or Firm* — Haley Guiliano LLP

(57)     ABSTRACT

Systems and methods are provided herein for recommending a pause position during a binge-watching session. A series containing multiple sequential episodes is provided to a user device. Then it is determined whether the user is engaged in binge-watching the series. If the user is binge-watching the series, a binge compulsion score is determined for each episode of the plurality of sequential episodes, where the binge compulsion score is based on how many additional sequential episodes an average user has watched after watching that episode. Then, in response to determining that the binge compulsion score of the next episode corresponds to a threshold, a prompt is generated for display, where the prompt includes a recommendation to the user to pause the series before the next episode begins.

20 Claims, 8 Drawing Sheets

<u>900</u>

Related U.S. Application Data continuation of application No. 15/815,345, filed on Nov. 16, 2017, now Pat. No. 10,349,143.

(51) Int. Cl.

| | | |
|---|---|---|
| *H04N 21/258* | (2011.01) |
| *H04N 21/442* | (2011.01) |
| *H04N 21/45* | (2011.01) |
| *H04N 21/466* | (2011.01) |
| *H04N 21/6543* | (2011.01) |
| *H04N 21/845* | (2011.01) |

(52) U.S. Cl.

CPC ... *H04N 21/44226* (2020.08); *H04N 21/4532* (2013.01); *H04N 21/4667* (2013.01); *H04N 21/6543* (2013.01); *H04N 21/8456* (2013.01)

(56) References Cited

U.S. PATENT DOCUMENTS

| | | | |
|---|---|---|---|
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 9,591,050 | B1 | 3/2017 | Sherrets et al. |
| 10,349,143 | B2 * | 7/2019 | Agarwal ............ H04N 21/4532 |
| 10,375,443 | B2 * | 8/2019 | Patel ................ H04N 21/44008 |
| 10,652,619 | B1 * | 5/2020 | Panchaksharaiah ........................ H04N 21/42203 |
| 11,997,361 | B2 * | 5/2024 | Agarwal ............ H04N 21/4882 |
| 2002/0174430 | A1 | 11/2002 | Ellis et al. |
| 2005/0251827 | A1 | 11/2005 | Ellis et al. |
| 2008/0134043 | A1 * | 6/2008 | Georgis ................ H04L 67/104 348/E7.071 |
| 2010/0153885 | A1 | 6/2010 | Yates |
| 2014/0289241 | A1 | 9/2014 | Anderson |
| 2015/0312609 | A1 * | 10/2015 | Hoctor .............. G06Q 30/0631 725/14 |
| 2016/0316268 | A1 | 10/2016 | Carmichael et al. |
| 2017/0024471 | A1 | 1/2017 | Liu et al. |
| 2017/0078750 | A1 | 3/2017 | Ashkan et al. |
| 2018/0063580 | A1 * | 3/2018 | Wittke ................... G06F 16/71 |
| 2018/0270537 | A1 | 9/2018 | Eriksson et al. |
| 2018/0302677 | A1 | 10/2018 | Patel et al. |
| 2019/0149889 | A1 | 5/2019 | Agarwal et al. |

FOREIGN PATENT DOCUMENTS

| | | |
|---|---|---|
| WO | 2006064752 A1 | 6/2006 |
| WO | 2017058213 A1 | 4/2017 |

* cited by examiner

<u>100</u>

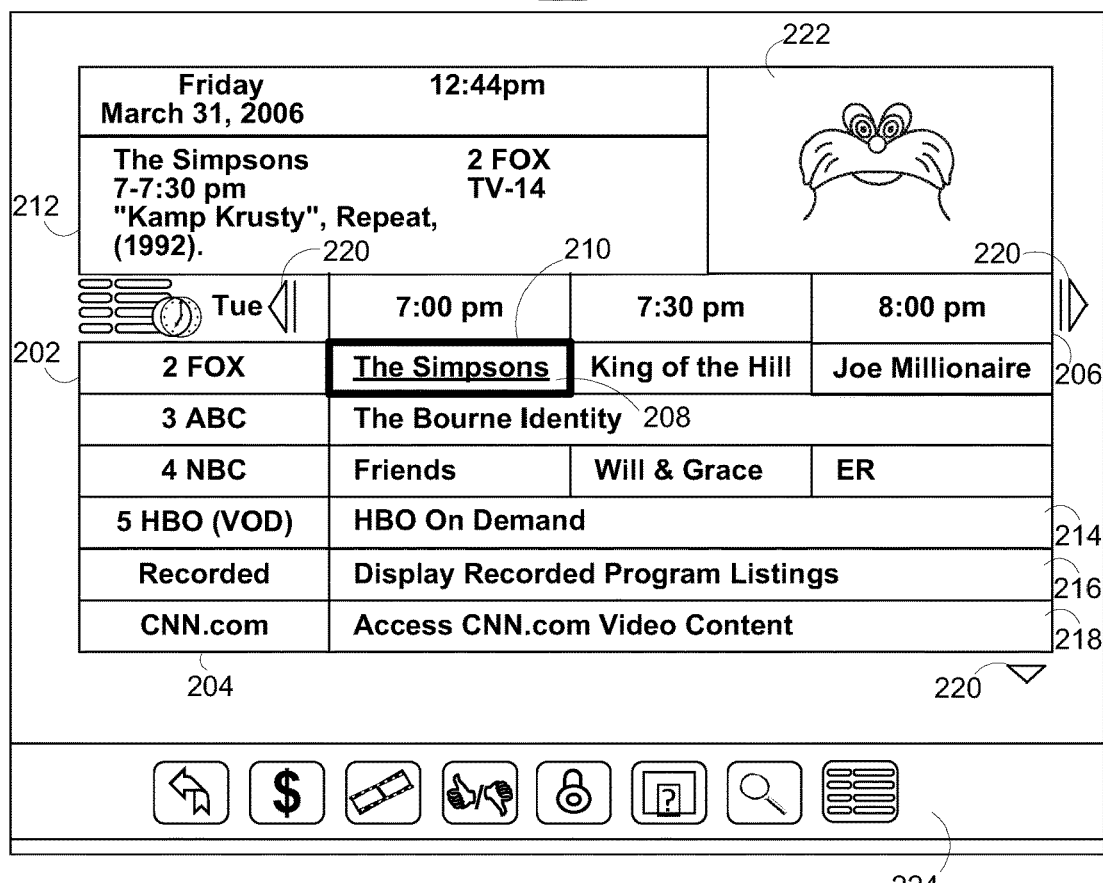

200

| | 222 |
| --- | --- |

Friday March 31, 2006    12:44pm

The Simpsons 7-7:30 pm    2 FOX TV-14

"Kamp Krusty", Repeat, (1992).

212

202

| | Tue ◁ | 7:00 pm | 7:30 pm | 8:00 pm | ▷ |
| --- | --- | --- | --- | --- | --- |
| | 2 FOX | The Simpsons | King of the Hill | Joe Millionaire | 206 |
| | 3 ABC | The Bourne Identity 208 | | | |
| | 4 NBC | Friends | Will & Grace | ER | |
| | 5 HBO (VOD) | HBO On Demand | | | 214 |
| | Recorded | Display Recorded Program Listings | | | 216 |
| | CNN.com | Access CNN.com Video Content | | | 218 |

| Media Provider | | 306 | 2:07 pm |
| --- | --- | --- | --- |
| Back to TV | | | |
| TV Listings | | Image #1 | |
| On Demand | | | |
| News | | | |
| Sports | | | |
| Kids | | | |
| Local | | | |

304

302

| | 308 | 310 | 312 |
| --- | --- | --- | --- |
| 314 | Image #2 | Image #3 | Image #4 |
| 316 | CNN | ESPN | KIDS |

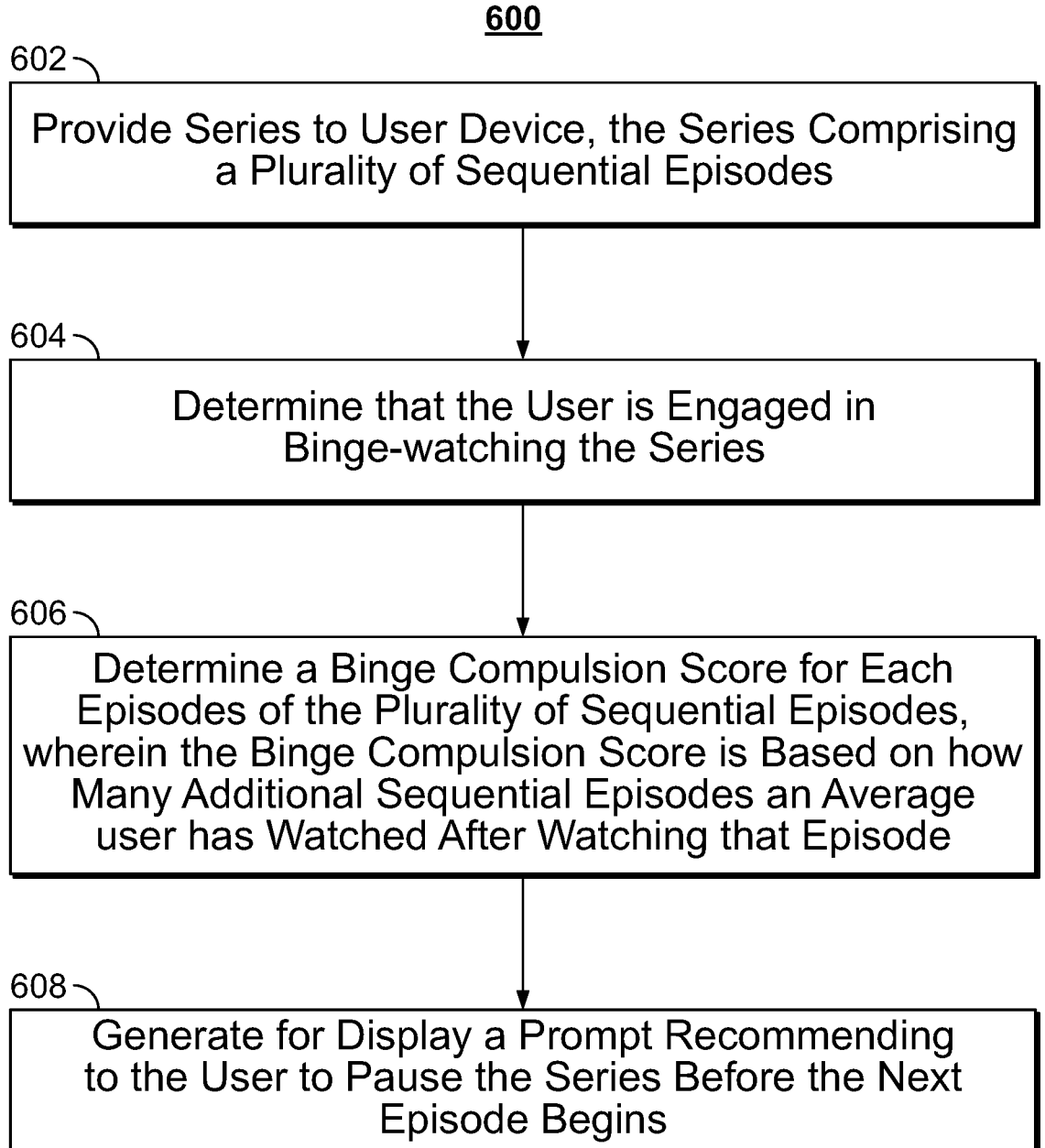

600

602

Provide Series to User Device, the Series Comprising a Plurality of Sequential Episodes

604

Determine that the User is Engaged in Binge-watching the Series

606

Determine a Binge Compulsion Score for Each Episodes of the Plurality of Sequential Episodes, wherein the Binge Compulsion Score is Based on how Many Additional Sequential Episodes an Average user has Watched After Watching that Episode

608

Generate for Display a Prompt Recommending to the User to Pause the Series Before the Next Episode Begins

FIG. 6

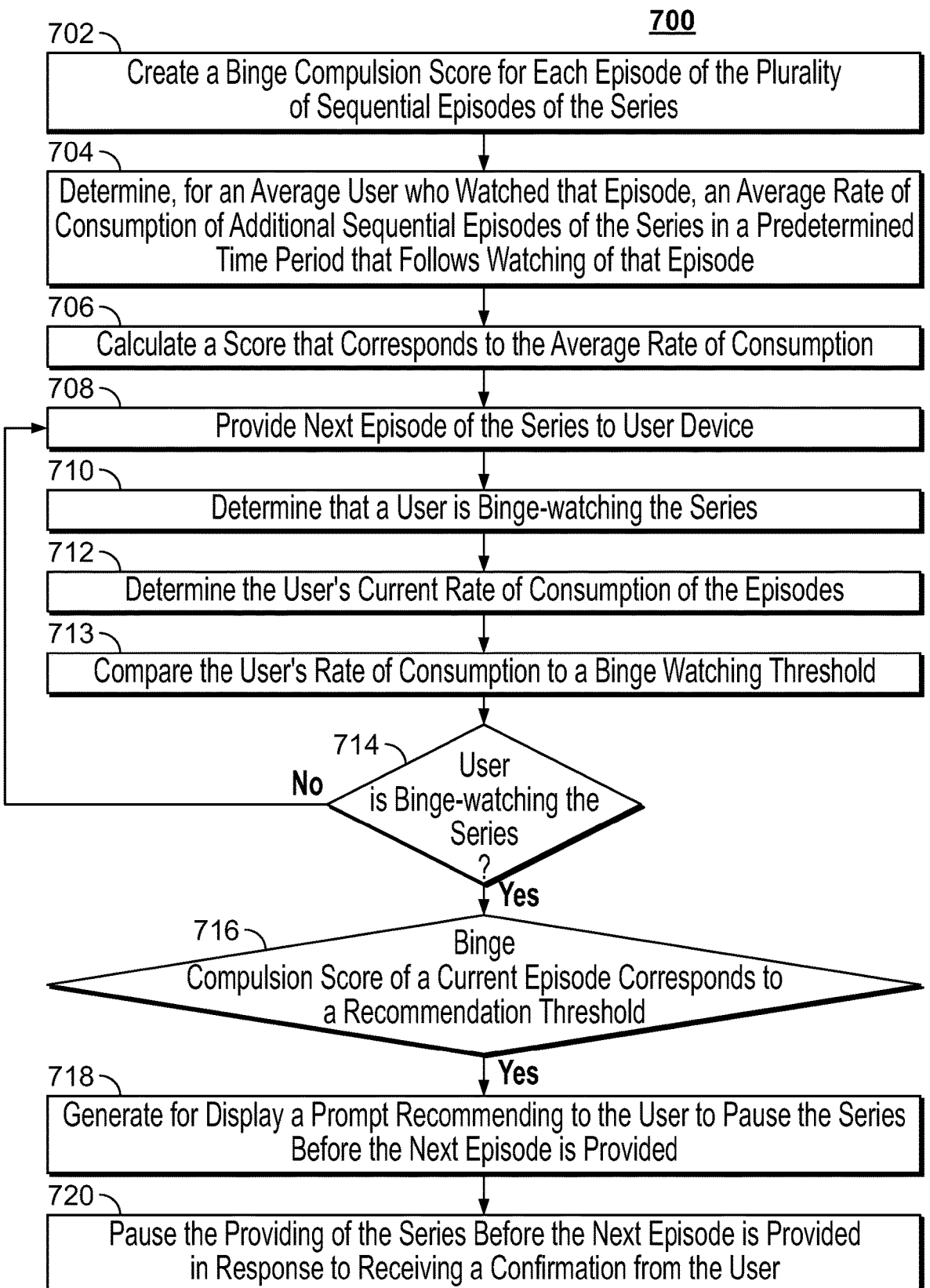

700

702 — Create a Binge Compulsion Score for Each Episode of the Plurality of Sequential Episodes of the Series 704 — Determine, for an Average User who Watched that Episode, an Average Rate of Consumption of Additional Sequential Episodes of the Series in a Predetermined Time Period that Follows Watching of that Episode 706 — Calculate a Score that Corresponds to the Average Rate of Consumption 708 — Provide Next Episode of the Series to User Device 710 — Determine that a User is Binge-watching the Series 712 — Determine the User's Current Rate of Consumption of the Episodes 713 — Compare the User's Rate of Consumption to a Binge Watching Threshold 714 — User is Binge-watching the Series ?

No

Yes

716 — Binge Compulsion Score of a Current Episode Corresponds to a Recommendation Threshold Yes 718 — Generate for Display a Prompt Recommending to the User to Pause the Series Before the Next Episode is Provided 720 — Pause the Providing of the Series Before the Next Episode is Provided in Response to Receiving a Confirmation from the User

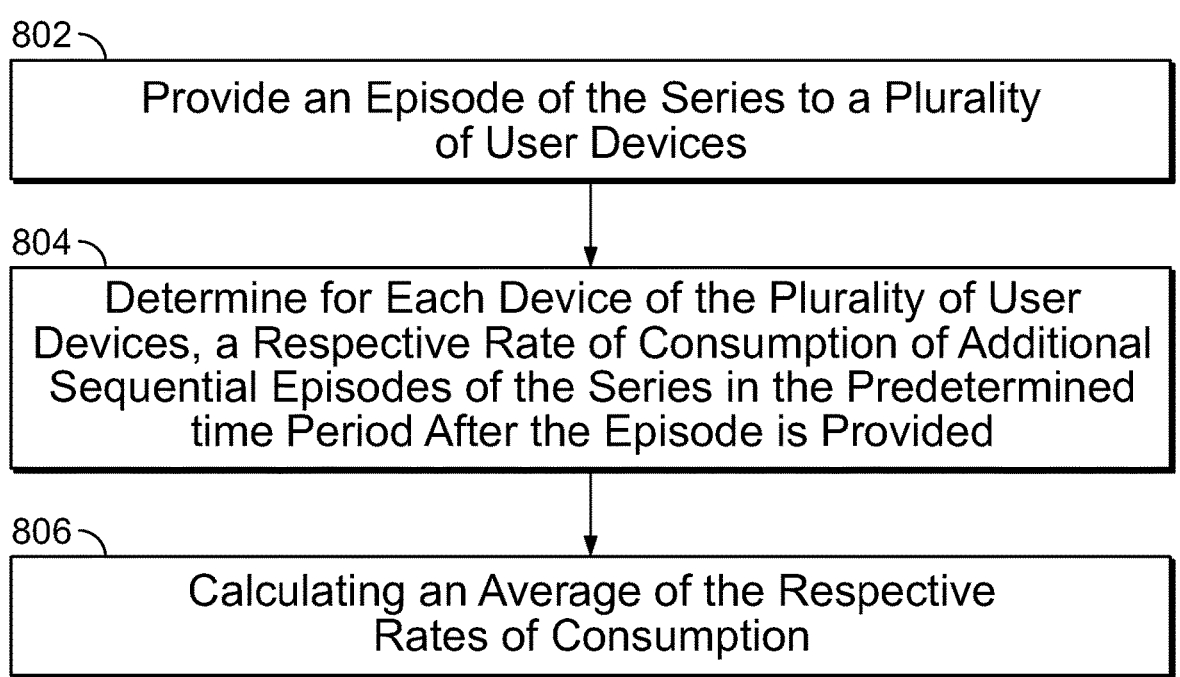

802

Provide an Episode of the Series to a Plurality
of User Devices

804

Determine for Each Device of the Plurality of User
Devices, a Respective Rate of Consumption of Additional
Sequential Episodes of the Series in the Predetermined
time Period After the Episode is Provided

806

Calculating an Average of the Respective
Rates of Consumption

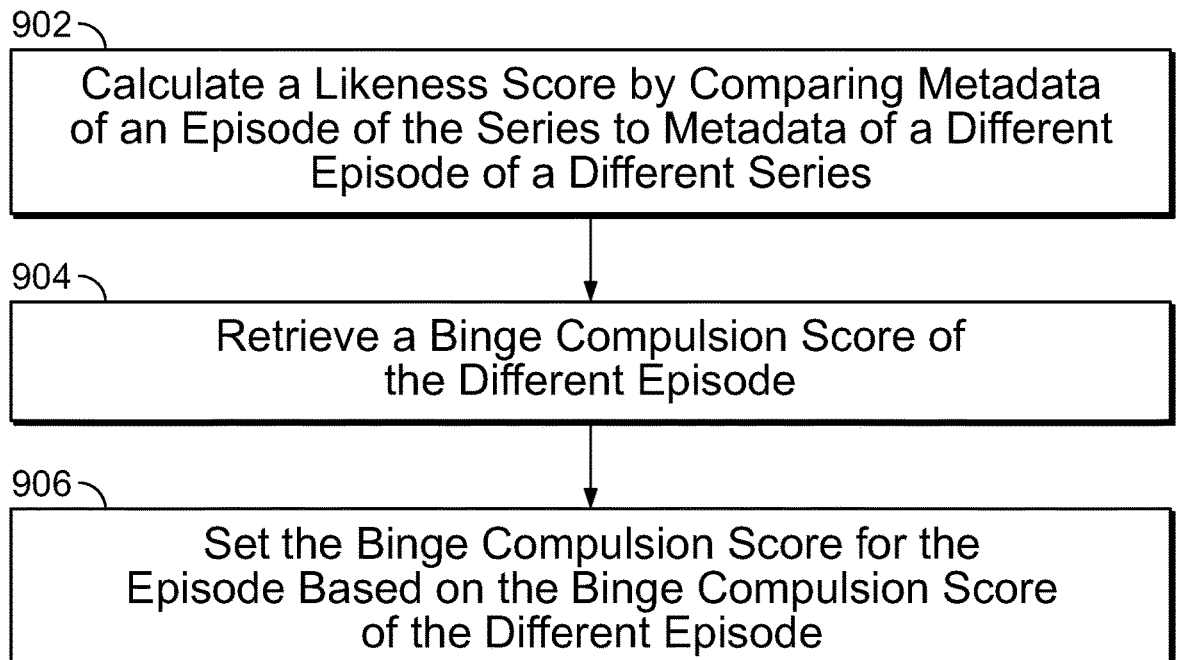

902

Calculate a Likeness Score by Comparing Metadata
of an Episode of the Series to Metadata of a Different
Episode of a Different Series

904

Retrieve a Binge Compulsion Score of
the Different Episode

906

Set the Binge Compulsion Score for the
Episode Based on the Binge Compulsion Score
of the Different Episode

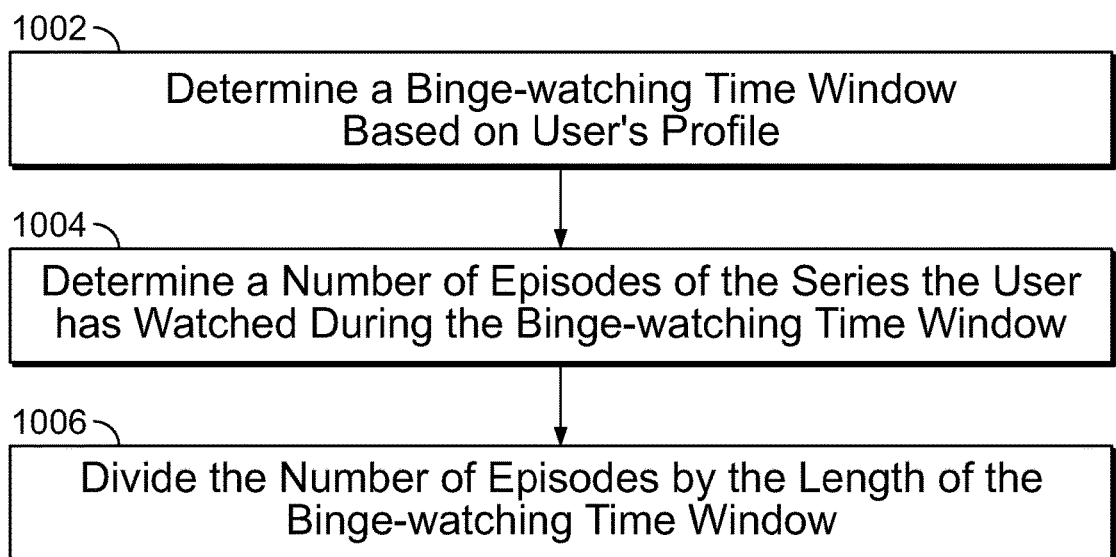

1002 — Determine a Binge-watching Time Window Based on User's Profile

1004 — Determine a Number of Episodes of the Series the User has Watched During the Binge-watching Time Window 1006 — Divide the Number of Episodes by the Length of the Binge-watching Time Window

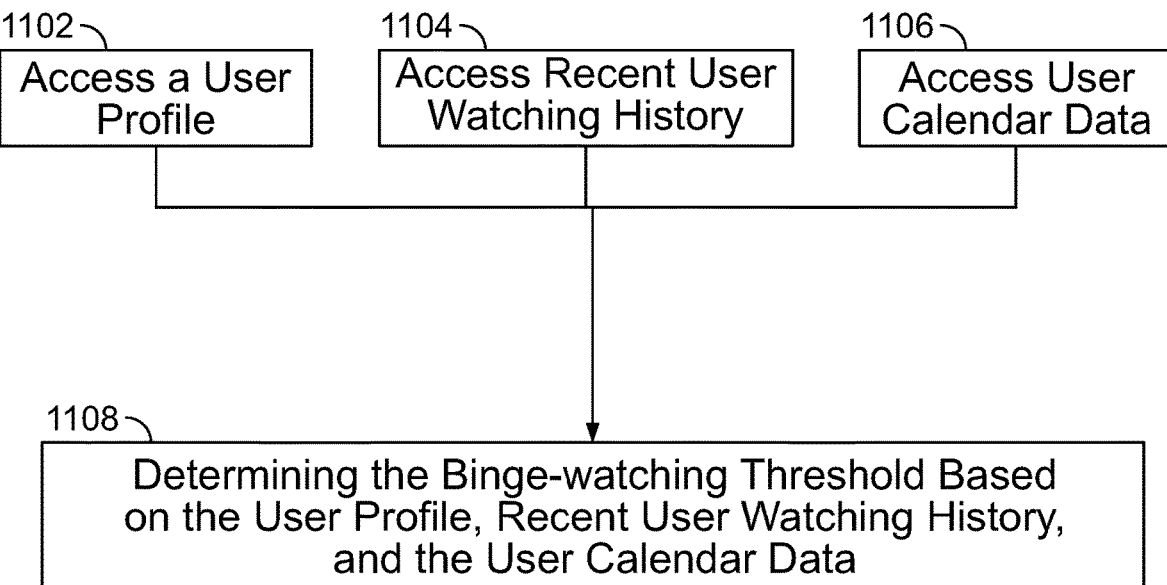

1102 — Access a User Profile

1104 — Access Recent User Watching History

1106 — Access User Calendar Data

1108 — Determining the Binge-watching Threshold Based on the User Profile, Recent User Watching History, and the User Calendar Data

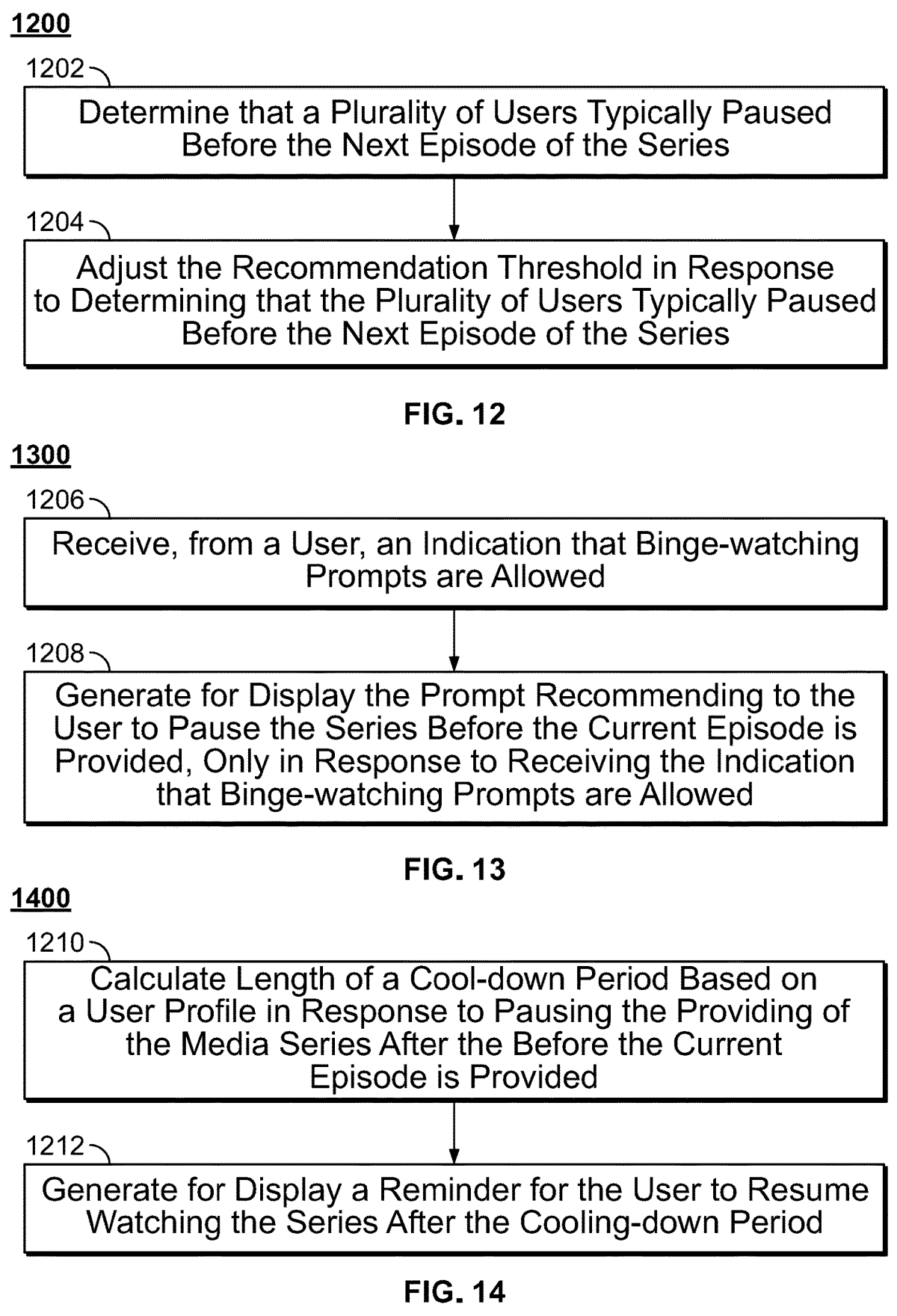

Determine that a Plurality of Users Typically Paused Before the Next Episode of the Series

1204

Adjust the Recommendation Threshold in Response to Determining that the Plurality of Users Typically Paused Before the Next Episode of the Series

Receive, from a User, an Indication that Binge-watching Prompts are Allowed

1208

Generate for Display the Prompt Recommending to the User to Pause the Series Before the Current Episode is Provided, Only in Response to Receiving the Indication that Binge-watching Prompts are Allowed

Calculate Length of a Cool-down Period Based on a User Profile in Response to Pausing the Providing of the Media Series After the Before the Current Episode is Provided

1212

Generate for Display a Reminder for the User to Resume Watching the Series After the Cooling-down Period

FIG. 14

SYSTEMS AND METHODS FOR PROVIDING BINGE-WATCHING PAUSE POSITION RECOMMENDATIONS

CROSS-REFERENCE TO RELATED APPLICATIONS

The instant application is a continuation of U.S. patent application Ser. No. 16/503,008 filed on Jul. 3, 2019, which is a continuation of U.S. patent application Ser. No. 15/815, 345 issued as U.S. Pat. No. 10,349,143, the entire disclosures of which are incorporated herein by reference.

BACKGROUND

Binge-watching is serious issue that can negatively affect television or media watching experiences for users. Binge-watching is of particular concern when multiple sequential episodes of a TV series are available for on-demand viewing. In such cases, a user will often repeatedly request a next episode of the series, often while losing track of time and potentially spending much more time than he or she intended to spend on watching TV. Some television systems or media consumption systems may provide warnings when a user spends too much time watching TV, or watches too many episodes of the same show. However, such warnings are often inefficient because they fail to account for how likely each episode of the series is to cause or prolong binge-watching. In addition, such warnings are not based on how other users behaved after watching a particular episode. Thus, warnings provided by existing systems will often warn a user when he is not at a risk of unplanned binge-watching and fail to warn the user when the risk of unplanned binge-watching is high.

SUMMARY

To this end and others, systems and method are provided that improve the media consumption experience for users by providing improved binge-watching warnings. In particular, a warning may be provided based on evaluating how likely each episode of the series is to cause binge-watching behavior. For example, consumption patterns of multiple users can be tracked to establish how likely each episode is to cause binge-watching. Data may be collected as to how rapidly an average user tends to watch additional episodes after watching a particular episode. Consequently, if a user is binge-watching a series, a prompt to pause playback may be provided when the user encounters or is about to encounter an episode that is particular likely to cause more binge-watching. Such tailored warnings provide a significant improvement to existing media consumption systems, by providing prompts to pause the watching of the series at key times when a user may be particularly vulnerable to unplanned binge-watching.

In some embodiments, a media guidance application provides a media asset series to a user device, the series comprising a plurality of sequential episodes. For example, the media guidance application may provide the "Game of Thrones" TV series, where the series has seven sequential episodes, e.g.: "Episode 1," "Episode 2" . . . "Episode 7." In some embodiments, any series may be provided having any number of sequential episodes. In some embodiments, the media guidance application may determine that the user is engaged in binge-watching. For example, the media guidance application may determine that the user is watching sequential episodes at a rate that is faster than a threshold rate. In some embodiments, the media guidance application may determine that the user is engaged in binge-watching when the user watches more than three episodes in four hours or less.

In some embodiments, the media guidance application may determine a binge compulsion score for each episode of the plurality of sequential episodes. For example, the media guidance application may determine a score for each of the "Episode 1," "Episode 2" . . . "Episode 7" of the "Game of Thrones" TV series. In some embodiments, the media guidance application may determine a binge compulsion score for each episode based on how many additional sequential episodes an average user has watched after watching that episode. For example, if after watching "Episode 1," an average user went on to also watch two more sequential episodes (e.g., "Episode 2" and "Episode 3") in a certain period of time, the media guidance application may set the binge compulsion score to a value of "2." In another example, if after watching "Episode 3," an average user went on to also watch three more sequential episodes (e.g., "Episode 4," "Episode 5," and "Episode 6") in a short period of time, the media guidance application may set the binge compulsion score to a value of "3."

In some embodiments, the media guidance application may determine that the binge compulsion score of the next episode corresponds to a threshold. For example, watching more than four episodes in a row may be considered detrimental to the user, and the threshold may be set to "3," which would correspond to an expected behavior of watching an episode, followed by watching three additional episodes in a certain period of time. In some embodiments, the media guidance application may then compare the binge compulsion score of a next episode to the threshold. For example, if the media guidance applications is about to begin playing "Episode 3," after already playing "Episode 1" and "Episode 2" within a threshold period of time, the media guidance application may determine that the binge compulsion score of "Episode 3" is "3" which corresponds to (e.g., equals or exceeds) the threshold that is also "3."

In some embodiments, in response to determining that the binge compulsion score of the next episode corresponds to a threshold, the media guidance application may generate for display a prompt recommending to the user to pause the series before the next episode begins. For example, the media guidance application may generate a prompt that includes the text "Most users went on to watch three more episodes after watching 'Episode 3' please consider watching 'Episode 3' tomorrow."

In some embodiments, the media guidance application may perform a method for recommending a pause position during binge-watching of series that comprises a plurality of sequential episodes. For example, the media guidance application may provide pause position recommendations related to providing the "Game of Thrones" TV series, where the series has seven sequential episodes, e.g.: "Episode 1," "Episode 2" . . . "Episode 7." For example, the media guidance application may anticipate that the user is likely to watch more episodes of the TV series than he originally intended, and recommend a pause position to prevent such a scenario. In some embodiments, the media guidance application may create a binge compulsion score for each episode of the plurality of sequential episodes of the series. For example, the media guidance application may create a binge compulsion score for each of the episodes: "Episode 1," "Episode 2" . . . "Episode' 7."

In some embodiments, the media guidance application may create a binge compulsion score for each of the episodes by determining, for an average user who watched that episode, an average rate of consumption of additional sequential episodes of the series in a predetermined time period that follows watching of that episode. For example, the predetermined time period may be 4 hours. In some embodiments, the media guidance application may analyze the number of sequential episodes in a 4-hour time window that were consumed by an average user following the conclusion of an initial episode.

In some embodiments, the media guidance application may, for each episode of the plurality of sequential episodes of the series, calculate a score that corresponds to the average rate of consumption of additional episodes. For example, the binge compulsion score may be set to be equal to the average rate of consumption of additional episodes. In another example, the media guidance application may set the binge compulsion score to the average rate of consumption that is scaled based on another factor, e.g., length of that episode, popularity of the media, or any other factor. In another example, a binge compulsion score may be selected from a scale of 1-10 (or any other range) scale. For example, a score of "1" may indicate that the episode is not likely to cause binge compulsion, while the score of "10" may indicate that the episode is highly likely to cause binge compulsion. For example, an episode with an average rate of consumption of additional sequential episodes of 4 episodes per 4 hours may correspond to a compulsion score of "10, while an episode with an average rate of consumption of additional sequential episodes of 0.5 episodes per 4 hours may correspond to a compulsion score of "1."

In some embodiments, the media guidance application may provide episodes of the series to a user device. For example, the media guidance application may provide a TV series for display on the user's TV or computer screen. In some embodiments, the TV show series may include a plurality of sequential episodes. For example, the series may include episodes labeled: Episode 1," "Episode 2" . . . "Episode 7." The episodes may be intended to be viewed sequentially. In some embodiments, the media guidance application may begin providing the series at "Episode 1." In some embodiments, the media guidance application may provide the series beginning with any episode the user selects (e.g., an episode that follows the last episode the user has accessed).

In some embodiments, the media guidance application may determine that a user is binge-watching the series. In some embodiments, the media guidance application may determine that the user is watching too many episodes in a row, or is watching episodes too rapidly. For example, the media guidance application may determine that a user is binge-watching the series because the user watched 4 episodes in a row within a threshold period of time (e.g., 4 hours).

In some embodiments, the media guidance application may determine that a user is binge-watching the series by determining the user's current rate of consumption of the episodes. For example, the media guidance application may track the user's consumption over a preset or dynamic time window and identify how many episodes were consumed during that time period. For example, the media guidance application may track the user's consumption of episodes within a rolling 4-hour window (or a window of any other length). The rolling window may be pre-set or adjusted based on user profile, or based on other information. In some embodiments, the media guidance application may count how many episodes the user has consumed during the time window, and divide that number by the length of the rolling window. For example, if the user watched 3 episodes during the 4-hour time window, the media guidance application may determine that the user is watching the series at a rate of "3 episodes per 4 hours."

In some embodiments, the media guidance application may determine whether the user's rate of consumption corresponds to a binge-watching threshold. For example, the binge-watching threshold may be set based on the length of the episodes, e.g., for shorter episodes (e.g., half-an-hour episodes) a higher threshold may be set, while for longer episodes (e.g., one hour episodes) a higher threshold may be set. In some embodiments, the threshold may be set based on the user's profile or based on any other factor. For example, the binge-watching threshold may be set to a value of "3 episodes per 4 hours." In some embodiments, the media guidance application may determine that a user is engaged in binge-watching if the user's rate of consumption corresponds to a binge-watching threshold. For example, if the user's rate of consumption is "3.5 episodes per 4 hours" while the threshold is "3 episodes per 4 hours," the media guidance application may determine that the user is binge-watching the series.

In some embodiments, the media guidance application may perform a series of steps in response to determining that the user is binge-watching the series. In some embodiments, the series of steps may include determining whether the binge compulsion score of a next episode corresponds to a recommendation threshold. For example, the media guidance application may determine whether the binge compulsion score of a next episode that is about to be provided to the user device equals or exceeds a pre-set or dynamic recommendation threshold. For example, if the media guidance application is about to begin providing "Episode 4" of the series, the media guidance application may compare the binge compulsion score of "Episode 4" (e.g., "3.5 episodes per 4 hours") to a threshold (e.g., "3 episodes per 4 hours") and determine that the binge compulsion score does correspond to (e.g., equals to or exceeds) the recommendation threshold.

In some embodiments, in response to determining that the binge compulsion score of the next episode corresponds to the recommendation threshold, the media guidance application may generate for display a prompt recommending to the user to pause the series before the next episode is provided. For example, the media guidance application may generate a prompt that includes text: "Please consider pausing, because watching the next episode is likely to make you watch four additional episodes," or may include a text: "The next episodes is highly likely to cause binge-watching, please consider watching it at another time."

In some embodiments, the media guidance application may generate binge watching in the middle of an episode. For example, the media guidance application may determine that a certain portion of an episode contains a spoiler. In this example, if the binge compulsion score of the current episode corresponds to the recommendation threshold, the media guidance application may generate for display a prompt recommending to the user to pause the series before the spoiler is revealed. In another example, the media guidance application may determine that a certain portion of an episode contains a higher binge compulsion score than the episode taken as a whole. In this example, if the binge compulsion score of a portion of the current episode corresponds to the recommendation threshold, the media guidance application may generate for display a prompt recommending to the user to pause the episode before that portion is provided.

In some embodiments, the media guidance application may receive a confirmation from a user (e.g., a user confirming the recommendation prompt). The media guidance application may then pause the providing of the series before the next episode is provided. For example, if the media guidance application generated a recommendation prompt prior to playing "Episode 4," the media guidance application may pause the providing of the series before "Episode 4" is played, if the user confirmed the prompt.

In some embodiments, the media guidance application may ask a user to input a password or a PIN code as a part of the conformation. In some embodiments, the media guidance application may then require an input of the password or the PIN code before resuming providing of the series. In some embodiments, the media guidance application may "hard" lock providing of the series for a certain cool-down period. For example, a user may be unable to resume playback of the series for 24 hours.

In some embodiments, to create a binge compulsion score for each episode, the media guidance application may provide an episode of the series to a plurality of user devices. For example, to determine the binge compulsion score of "Episode 1," the media guidance application may provide "Episode 1" to a plurality of user devices. The media guidance application may then determine, for each of the plurality of users, how many additional episodes of the series were consumed in a predetermined time period (e.g., 4 hours) after the initial episode (e.g., "Episode 1") was consumed. In some embodiments, the media guidance application may determine how many sequential episodes were consumed by each user in that time period. In some embodiments, the media guidance application may then divide the number of episodes consumed by the length of the time period. For example, a particular user of the plurality of users, after consuming "Episode 1," may have watched 3 more episodes in a 4-hour time period. In some embodiments, the media guidance application may then calculate the rate of consumption of additional sequential media for that user as 3 (number of additional episodes watched) divided by the length of the predetermined time period (4 hours). In this example, the media guidance application may determine that the rate of consumption of additional sequential episodes is "3 episodes per 4 hours" or "0.75 episodes per hour" for that user.

In some embodiments, the media guidance application may calculate an average of the respective rates of consumption for the plurality of users. In some embodiments, the media guidance application may average the rate of consumption of additional sequential episodes for multiple users to determine the average rate of consumption of additional sequential episodes for each episode of the series. For example, if one user consumed additional episodes at a rate of "3 episodes per 4 hours," while another user consumed additional episodes at a rate of "2 episodes per 4 hours," the average rate of consumption may be calculated to be "2.5 episodes per 4 hours." In some embodiments, the media guidance application may average rates of consumption for any number of users (e.g., for hundreds or thousands of users.) In some embodiments, the media guidance application may select the plurality of users to have demographic profiles similar to the user's.

In some embodiments, the media guidance application may not be able to empirically determine the binge compulsion score for each episode. In some embodiments, instead, the media guidance application may create a binge compulsion score for each episode by using a binge compulsion score of a different episode that is similar to the one being evaluated. In some embodiments, the media guidance application may calculate a likeness score by comparing metadata of an episode of the series to metadata of a different episode of a different series. For example, the media guidance application may compare genre metadata, review-score metadata data, or any other metadata to calculate the likeness score. In some embodiments, the better the metadata matches, the higher the likeness score may be.

In some embodiments, the media guidance application may determine that the likeness score corresponds to a likeness threshold. For example, if the likeness score is greater than a threshold, the media guidance application may determine that the episode and the different episode are sufficiently similar. For example, an episode of "Game of Thrones" maybe found to be sufficiently similar to an episode of "the Tudors." In some embodiments, the media guidance application may, in response to determining that the likeness score corresponds to a likeness threshold, retrieve a binge compulsion score of the different episode, and set the binge compulsion score for the episode based on the binge compulsion score of the different episode. For example, if the different episode has a binge compulsion score of "3.5 episodes per 4 hours," the media guidance application may set the binge compulsion score for the episode to also be "3.5 episodes per 4 hours."

In some embodiments, the media guidance application may identify multiple different episodes that are sufficiently alike to the episode. In some embodiments, the media guidance application may then set the binge compulsion score for the episode to be equal to an average of binge compulsion scores of a plurality of different episodes that have a likeness score that exceeds the likeness threshold.

In some embodiments, the media guidance application may determine the user's current rate of consumption of the episodes by selecting a binge-watching time window based on the user's profile. For example, the media guidance application may determine the length of the binge-watching time window based on the user's age. For example, a child who is under 14 years old may have a time window (e.g. 2.5 hours) that is shorter than a binge-watching time window for an adult (e.g., 4 hours). In some embodiments, the media guidance application may determine the binge-watching time window based on existing parental control settings.

In some embodiments, the media guidance application may determine a number of episodes of the series the user has watched during the binge-watching time window. For example, the media guidance application may determine how many episodes were watched during a 4-hour window. In some embodiments, the media guidance application may then divide the number of episodes by the length of the binge-watching time window. For example, if three episodes were watched, the media guidance application may determine the user's current rate of consumption of the episodes by dividing a value of "3" (3 episodes) by the value "4" (4 hours).

In some embodiments, the media guidance application may further access a user profile, access recent user watching history, and access user calendar data. In some embodiments, the media guidance application may then determine the binge-watching threshold based on any one of the user profile, recent user watching history, and the user calendar data, or any combination thereof.

In some embodiments, the media guidance application may use the age of the user from the user profile to determining the binge-watching threshold. For younger users, the binge-watching threshold may be set lower than the binge-watching threshold for older users. In some embodiments, the media guidance application may use recent user watching history to set the binge-watching threshold. For example, if the user recently engaged in binge-watching, the binge-watching threshold may be set lower. In some embodiments, the media guidance application may use the user's calendar data to set the binge-watching threshold. For example, if the user has appointments that are coming up soon, the media guidance application may decrease the binge-watching threshold.

In some embodiments, the media guidance may determine that a plurality of users typically paused the series before the next episode of the series. For example, the media guidance application may determine that a disproportionally large number of users stopped watching the series before "Episode 4." In some embodiments, the media guidance application may then adjust the recommendation threshold. For example, the media guidance application may be more likely to generate the pause prompt before "Episode 4" if a plurality of other users typically paused before the next episode of the series.

In some embodiments, the media guidance application may receive, from a user, an indication that binge-watching prompts are allowed. For example, such an indication may be received when the user device is initially provisioned. For example, the user may check a checkbox that reads "allow binge-watching prompts." In some embodiments, the media guidance application may generate for display the prompt recommending to the user to pause the series before next episode is provided, only in response to receiving the indication that binge-watching prompts are allowed.

In some embodiments, the media guidance application may generate reminders to resume the series later in time. In some embodiments, the media guidance application may, in response to pausing the providing of the series before the next episode is provided, calculates length of a cool-down period based on a user profile. For example, the media guidance application may use demographic information of the user to set the cool-down period. For example, for users under the age of 14, the cool-down period may be set for 2 days, while for older users the cool-down period may be set for 1 day. In some embodiments, the media guidance application may generate for display a reminder for the user to resume watching the series after the cooling-down period. For example, after 1 day, the media guidance application may generate a message was "would you like to resume watching the series that was paused earlier?"

In some embodiments, the media guidance application may generate a prompt recommending to the user to pause the series before the next episode is provided to include an indication of how many episodes the average user watched after watching the current episode. For example, the prompt may include text "an average user went on to watch 3 more episodes after watching this one."

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

8

Figures 4, 5:
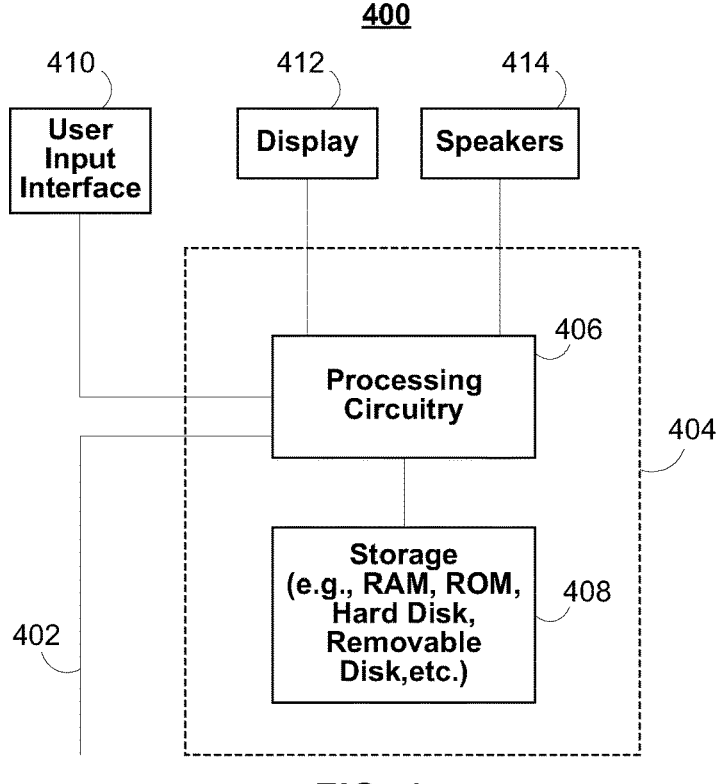

FIG. 2 shows another illustrative media guidance interface that may dynamically include or exclude a video, in accordance with some embodiments of the disclosure;

FIG. 3 shows yet another illustrative media guidance interface that may dynamically include or exclude a video, in accordance with some embodiments of the disclosure;

FIG. 4 is a block diagram of an illustrative user equipment device, in accordance with some embodiments of the disclosure;

FIG. 5 is a block diagram of an illustrative media system in accordance with some embodiments of the disclosure;

FIG. 6 depicts an illustrative flow diagram for a process of generating binge-watching pause recommendation prompts, in accordance with some embodiments of the disclosure;

FIG. 7 depicts another illustrative flow diagram for a process of generating binge-watching pause recommendation prompts, in accordance with some embodiments of the disclosure;

FIG. 8 depicts an illustrative flow diagram for a process of calculating an average rate of consumption in accordance with some embodiments of the disclosure;

FIG. 9 depicts an illustrative flow diagram for a process of setting the binge compulsion score in accordance with some embodiments of the disclosure;

FIG. 10 depicts an illustrative flow diagram for a process of determining the user's current rate of consumption of the episode in accordance with some embodiments of the disclosure;

FIG. 11 depicts an illustrative flow diagram for a process of determining the binge-watching threshold in accordance with some embodiments of the disclosure;

FIG. 12 depicts an illustrative flow diagram for a process of adjusting the recommendation threshold in accordance with some embodiments of the disclosure;

FIG. 13 depicts another illustrative flow diagram for a process of generating for display the recommendation prompts in accordance with some embodiments of the disclosure; and FIG. 14 depicts another illustrative flow diagram for a process of generating for display a reminder for the user to resume watching the series, in accordance with some embodiments of the disclosure.

DETAILED DESCRIPTION

Systems and methods are disclosed herein for providing intelligent pause recommendations to mitigate unintended binge-watching of a series by the user. For example, the media guidance application may determine when the user is binge-watching a series, and then evaluate the next episode before it is provided. The evaluation may include determining a binge compulsion score that is determined based on statistics associated with the next episode. In particular, the statistics may include how many episodes an average viewer watched right after (or within a short time window after) watching the current episode. A higher number of episodes indicates the higher potential of that episode to cause binge-watching. This information is then used to generate prompts or warnings to a user to pause the watching of the series before an episode that is likely to cause binge-watching. Such technique improves the ability of a media consumption system to provide a pleasant user experience. In particular, warnings are not provided when binge-watching is not likely to continue (so as not to annoy the user). In addition, the warnings may be provided when the user is highly likely to engage in binge-watching.

As referred to herein, the term "series" or "media asset series" refers to any kind of media (e.g., video, audio, or multimedia) content that includes distinct sequential episodes that may be watched separately from one another. For example, the television series "Game of Thrones" may include sequential episodes "Episode 1," "Episode 2," . . . "Episode 7." A series may be intended to be provided in a sequential order according to episode numbering via a television, a computer, or any other user device. In some embodiments, the term "series" may relate to an interconnected set of media that can be watched separately from one another in any order. For example, a collection of episodes of "Americas Funniest Home Videos" may be considered to be a series even if the user is not expected to watch such episodes in any particular order. For example, a user can watch episodes of the series "Americas Funniest Home Videos" series in any order such as: "Episode 7," "Episode 2," . . . "Episode 5."

As referred to herein, the term "episode" refers to any kind of media (e.g., video, audio, or multimedia) content that forms a distinct part of a series. Each episode can be watched separately from other episodes of the series. Episodes may be typically arranged sequentially by number such that content of one episodes follows content of a previous episode.

As referred to herein, the term "binge-watching" refers to any kind of rapid consumption of episodes of a series in a relatively short time period. In some embodiments, binge-watching may refer to watching several (e.g., three) episodes in a row. In some embodiments, binge-watching may refer to watching several (e.g., three) episodes in a short time period (e.g., four hours.) In some embodiments, binge-watching may refer to watching episodes of a series at a rapid rate, e.g., at a rate exceeding 3 episodes per 4 hours.)

As referred to herein, the phrase "binge compulsion score" refers to any metric or score that assesses or indicates the ability of an episode of a series to cause binge-watching behavior. In some embodiments, "binge compulsion score" may refer to a rate at which users historically consumed additional episodes after consuming a particular episode. In some embodiments, "binge compulsion score" may refer to a numeric score (e.g., a score in a range of 1-10), where a higher score indicates that the episode is comparatively more likely to cause binge-watching, and a lower score indicates a comparatively lower capability to cause binge-watching.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 1:
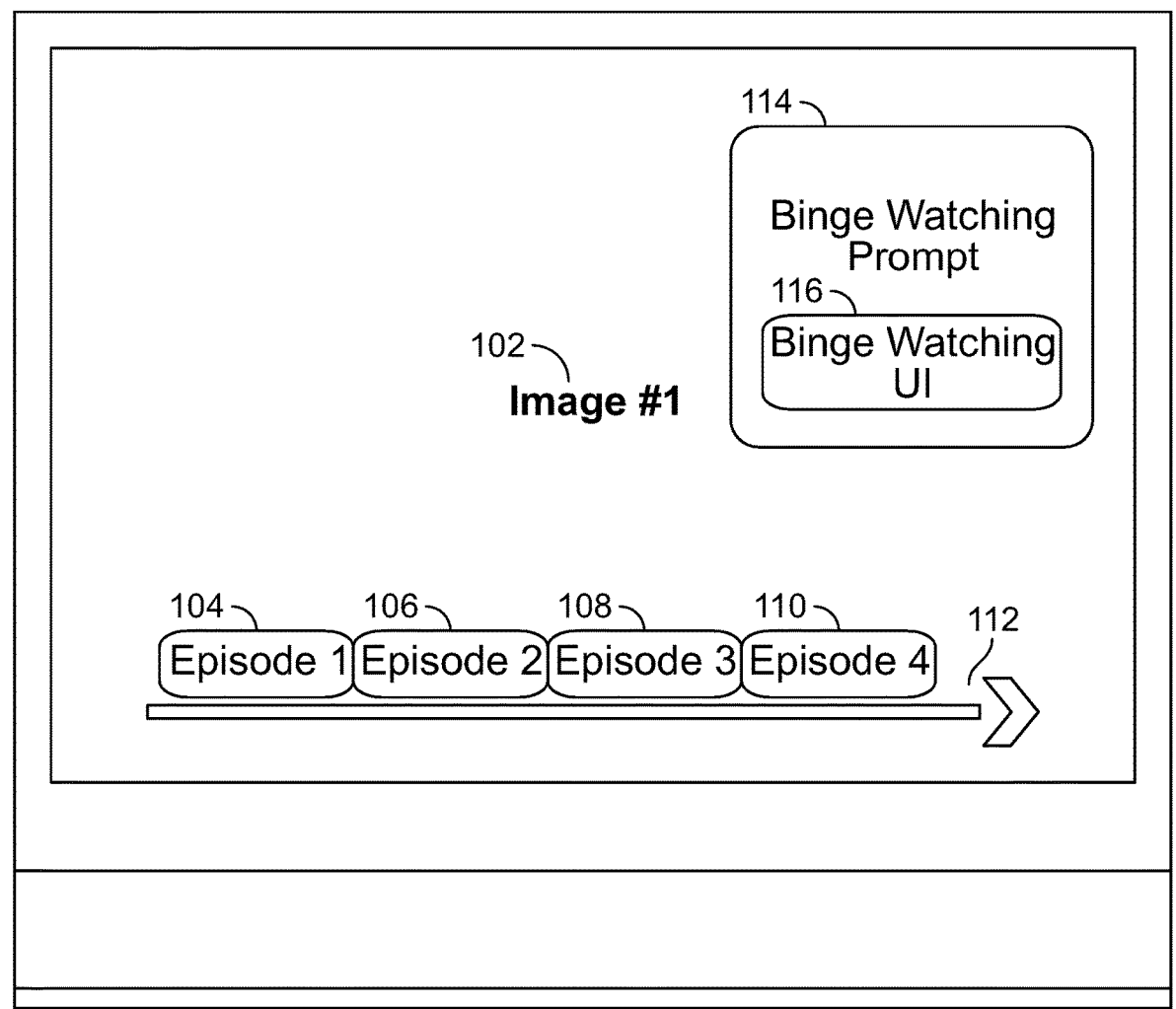
FIG. 1 shows an illustrative media guidance interface that may provide improved functionality for generating binge-watching pause recommendation prompts, in accordance with some embodiments of the disclosure.

FIG. 1 shows an illustrative media guidance interface on a display screen that may provide improved functionality for resuming playback of the video in accordance with various embodiments of the disclosure. Display 100 shows a media guidance interface for video presentation, user interface presentation, and optional timeline presentation. In some embodiments, display 100 may display media content provided by the media guidance application. For example, display 100 may display image 102. Image 102 may be a part of media content provided by the media guidance application. In some embodiments, media content provided by the media guidance application includes a series that contains a plurality of sequential episodes.

In some embodiments, display 100 may optionally include timeline 112 that tracks presentation of episodes 104, 106, 108, and 110 of the series. In some embodiments, timeline 112 may have any number of episodes. In some embodiments, the media guidance application may highlight the episode that is currently being provided. For example, if image 102 is from episode 106, episode 106 may be highlighted on timeline 112.

In some embodiments, the media guidance application may determine a binge compulsion score for each episode of the plurality of sequential episodes 104, 106, 108, and 110. For example, the media guidance application may determine the binge compulsion for episode 108 based on how many additional sequential episodes an average user has watched after watching episode 108. For example, if an average user went on to watch three more episodes after watching episode 108, the binge compulsion score for episode 108 may be set to "3."

In some embodiments, the media guidance application may determine if the user is currently binge-watching the series. For example, the media guidance application may track the number of episodes watched by the user in a certain time window. For example, if the user watched episode 104 and 106 in less than 2 hours, the media guidance application may determine that the user is engaged in binge-watching.

In some embodiments, the media guidance application may then monitor the binge compulsion score of the next episode. For example, the media guidance application may be about to start displaying episode 108. In some embodiments, the media guidance application may then compare the binge compulsion score of episode 108 against a recommendation threshold. For example, the binge compulsion score of episode 108 may be "3," indicating that the average user, after watching episode 108, has gone on to watch three more episodes of the series. The threshold may be set at any value (e.g., at a value of "2.5"). In this example, the media guidance application may determine that the binge compulsion score of episode 108 corresponds to (e.g. equals to or exceeds) the recommendation threshold. In this case, the media guidance application may then display binge-watching prompt 114, if the media guidance application has previously determined that the user is already engaged in binge-watching (e.g., because the user has already watched a certain number of episodes of the series in a row).

In some embodiments, binge-watching prompt 114 may include text prompting the user to pause the playback of the series before the next episode is shown. For example, binge-watching prompt 114 may include the text "please consider pausing, as most users watched 3 more episodes after the next one."

In some embodiments, binge-watching prompt 114 may include binge-watching user interface (UI) 116. For example, binge-watching UI 116 may include "yes" and "no" buttons. In some embodiments, if a "yes" button is pressed by the user, the media guidance application may pause the playback of the series. In some embodiments, binge-watching UI 116 may include other features, such an interface to set a reminder to resume watching the series after a cool-down period.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server.

Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Detailed descriptions of FIGS. 6-14 are provided below. It should be noted that processes 600-1400, or any step thereof, could be performed on, or provided by, any of the devices shown in, or described with respect to, FIGS. 4-5. For example, either process 600 or process 700 may be executed by control circuitry 404 (FIG. 4) as instructed by media guidance application(s) implemented on user equipment 502, 504, and/or 506 (FIG. 5). In addition, one or more steps of processes 600 and 700 may be incorporated into, or combined with, one or more steps of any other process or embodiment.

FIG. 6 depicts an illustrative flow diagram of a process 600 for generating binge-watching pause recommendation prompts in accordance with an embodiment of the disclosure. Process 600 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 600 begins at 602, where control circuitry 404 provides a series to a user device, the series including a plurality of sequential episodes (e.g., episodes 104, 106, 108, 110 of FIG. 1). For example, the media guidance application running on control circuitry 404 may generate a series for display on a display 412 of user television equipment 502. The media content may be generated for display by way of an explicit user selection to play the video, as a result of the user equipment being powered on, or by any other triggering events. In some embodiments, control circuitry 404 may provide episodes of the series sequentially in a predetermined order. In some embodiments, control circuitry 404 may provide related episodes (e.g., episodes of a family of interrelated episodes) in a dynamic order, a random order, or an order specified by the user. For example, the media guidance application may present episodes of a set of "America Funnies Home Videos" in order of popularity or in response to selection of a next episode by the user.

Process 600 continues to 604, where control circuitry 404 determines that the user is engaged in binge-watching the series. In some embodiments, control circuitry 404 may make this determination based on the rate at which the user consumes the episodes of the series. In some embodiments, control circuitry 404 may make this determination based on the user watching more than a certain number of episodes in a row. In some embodiments, control circuitry 404 may make this determination based on the user watching more than a certain number of episodes of a set of interrelated episodes in a certain time period. For example, control circuitry 404 may determine that the user is engaged in binge-watching if the user watched more than three episodes of "American Funnies Home Videos" in a certain time period (e.g., 3.5 hours), regardless of the order in which these episodes were watched. In response to determining that the user is engaged in binge-watching the series, control circuitry 404 may proceed to step 606.

Process 600 continues to 606, where control circuitry 404 may determine a binge compulsion score for each episode of the plurality of sequential or interrelated episodes. For example, control circuitry 404 may determine how likely each episode is to cause binge-watching. In some embodiments, control circuitry 404 may track historic patterns of binge behavior following an average user watching a particular episode. In some embodiments, control circuitry 404 may determine the binge compulsion score for an episode based on how many additional sequential episodes an average user has watched after watching that episode. For example, if after watching an episode, an average user went on to watch three more episodes in a short period of time (e.g., 4 hours), control circuitry 404 may set the binge compulsion score to a value of "3." In some embodiments, the period of time may be pre-set. In some embodiments, control circuitry 404 may dynamically determine or adjust the period of time based on at least one of the user profile, time of day, metadata of the series or any other factor.

In some embodiments, control circuitry 404 may determine the binge compulsion score for an episode based on how many additional episodes from a set of interrelated episodes an average user has watched after watching that episode. For example, if after watching an episode, an average user went on to watch three more interrelated episodes, in any order, in a short period of time (e.g., 4 hours), control circuitry 404 may set the binge compulsion score to a value of "3." In some embodiments, the period of time may be pre-set. In some embodiments, control circuitry 404 may dynamically determine or adjust the period of time based on at least one of the user profile, time of day, metadata of the series or any other factor.

Process 600 continues to 608, where control circuitry 404 may generate for display a prompt recommending to the user to pause the series before the next episode begins in response to determining that the binge compulsion score of the next episode (or a next episode selected by the users) corresponds to a threshold. For example, control circuitry 404 may set the threshold to a value of "2.5," indicating that a warning should be generated when the next episode (e.g., an episode about be displayed) can be expected to cause a user to watch, on average, 2.5 more sequential or interrelated episodes. In some embodiments, if control circuitry 404 determines that the score of the next episode (e.g., "3") exceeds the threshold (e.g., "2.5") control circuitry 404 may then generate for display a prompt (e.g., binge-watching prompt 114) (FIG. 1). In some embodiments, the prompt may include a recommendation to the user to pause the series before the next episode begins. For example, the prompt may include text: "Please consider watching this episode tomorrow, as the next episode causes most users to watch 3 more episodes."

In some embodiments, control circuitry 404 may generate prompts other than a stopping prompt. For example, control circuitry 404 may additionally or alternatively generate a prompt suggesting a different activity to the user. In some embodiments, control circuitry 404 may generate a prompt that suggest to a user that he or she should engage in a different activity other than watching the series. In some embodiments, control circuitry 404 may generate a prompt that suggest that user should engage in physical activity, such as a walk or a jog. In some embodiments, control circuitry 404 may generate a prompt that suggests presentation of a different media content unrelated to the series. For example, the prompt may include a hyperlink to different media content. In some embodiments, the different media content may have a low binge compulsion score.

In some embodiments, when the series comprises a set of interrelated episodes, control circuitry 404 may generate a prompt that suggests watching a different episode of the series instead of the episode that was going to be next. For example, if the user is watching "America Funniest Home Videos" series, control circuitry 404 may have determined that the next episode selected by the user has a binge compulsion score that corresponds to a threshold. In some embodiments, control circuitry 404 may then generate a prompt suggesting that a user should select a different episode of "America Funniest Home Videos" series that has a binge compulsion score that is lower than the threshold.

In some embodiments, control circuitry 404 may, in response to determining that the binge compulsion score of the next episode corresponds to a threshold, generate for display a prompt that suggest a break to the user. For example, control circuitry 404 may generate a prompt that includes a prompt "Please consider a 30-minute break." In some embodiments, control circuitry 404 may disable playback of the series for the duration of the suggested break, in response to the user indicating that he or she intends to take such a break.

FIG. 7 depicts an illustrative flow diagram of a process 700 for generating binge-watching pause recommendation prompts in accordance with an embodiment of the disclosure. Process 700 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 700 begins at 702, where control circuitry 404 creates a binge compulsion score for each episode of the plurality of sequential episodes of the series. In some embodiments, control circuitry 404 may, instead of creating the binge compulsion scores, retrieve the binge compulsion score for each episode of the plurality of sequential episodes of the series form a remote source, e.g., from media guidance data source 518 or media content source 516. In some embodiments, steps 702-706 may be performed by a remote device (e.g., media guidance data source 518) that may then provide the binge compulsion scores to control circuitry 404, e.g., via communication network 514.

In some embodiments, control circuitry 404 may create a binge compulsion score for each episode of series (e.g., "Game of Thrones") that includes a number (e.g., seven) episodes, e.g., "Episode 1," "Episode 2," . . . "Episode 7." In some embodiments, control circuitry 404 may optionally perform steps 704 and 706 to generate the binge compulsion scores.

Process 700 may continue to 702, where control circuitry 404 may determine, for an average user who watched that episode, an average rate of consumption of additional sequential episodes of the series in a predetermined time period that follows the watching of that episode. For example, control circuitry 404 may set the predetermined time period to be 4 hours. In some embodiments, control circuitry 404 may then, for a given episode, determine the rate of consumption, by an average user, of additional episodes during the predetermined time period. For example, if an average user consumes 3 more episodes during the 4-hour time period following the conclusion of a given episode, control circuitry 404 may set the average rate of consumption of additional sequential episodes for that episodes to be equal to "3 episodes per 4 hours."

Process 700 may continue to 702, where control circuitry 404 may calculate a score that corresponds to the average rate of consumption of additional episodes. In some embodiments, control circuitry 404 may set the binge compulsion score for an episode to be equal to the average rate of consumption of additional sequential episodes for that episodes. In some embodiments, control circuitry 404 may optionally adjust the binge compulsion score based on such factors as length of the episode, popularity of the episode, or any combination thereof. For example, for short episodes, control circuitry 404 may calculate a score by scaling down the average rate of consumption. In another example, a score on a 1-10 (or any other range) scale may be selected. For example, score of 1 may indicate that the episode is not likely to cause a binge compulsion, while the score of "10" may indicate that the episode is highly likely to cause a binge compulsion, where the likelihood of binge compulsion is based on the average rate of consumption.

Process 700 continues at 708, where control circuitry 404 provides the next episode of a series to a user device, the series including a plurality of sequential episodes (e.g., episodes 104, 106, 108, 110 of FIG. 1). For example, the media guidance application running on control circuitry 404 may generate a series for display on a display 412 of user television equipment 502. The media content may be generated for display by way of an explicit user selection to play the video, as a result of the user equipment being powered on, or by any other triggering events. In some embodiments, control circuitry 404 may provide episodes of the series sequentially in a predetermined order. For example, control circuitry 404 may begin providing the series at "Episode 1" if the user is new to the series. In some embodiments, control circuitry 404 may provide a next episode in the series if some episodes were already watched. For example, if the user already watched "Episode 1" and "Episode 2," control circuitry 404 may provide "Episode 3."

Process 700 continues at 710, where control circuitry 404 may determine whether a user is binge-watching the series. For example, control circuitry 404 may determine that the user has watched more than a certain number of episodes in a row. In another embodiment, control circuitry 404 may determine whether a user is binge-watching the series based on the user's rate of consumption of episodes. In some embodiments, control circuitry 404 may optionally perform steps 712 and 713 to determine whether a user is binge-watching the series.

Process 700 may optionally continue at 712 where control circuitry 404 may determine the user's current rate of consumption of the episodes. In some embodiments, control circuitry 404 may determine the user's rate of consumption of the episodes in a rolling time window (e.g., a 3-hour window). In some embodiments, control circuitry 404 may determine that the user has watched 2 episodes in 3 hours and thus that the user's rate of consumption is "2 episodes per 3 hours."

Process 700 may optionally continue at 713 where control circuitry 404 may determine that the user's rate of consumption corresponds to a binge-watching threshold. In some embodiments, the media guidance application may compare the user's rate of consumption to a binge-watching threshold. For example, control circuitry 404 may maintain a pre-set threshold indicative of binge-watching behavior. For example, consuming more than 2 episodes per 3 hours may be classified as binge-watching. In some embodiments, control circuitry 404 may compare the user's rate of consumption of the episodes against the threshold. For example, if the user's rate of consumption of the episodes is ""2.5 episodes per 3 hours," while the threshold is "2 episodes per 3 hours," control circuitry 404 may determine that the user's rate of consumption corresponds to (e.g., equals or exceeds) a binge-watching threshold. Process 700 continues at 714, where control circuitry 404 may proceed to different blocks depending on whether the user is binge-watching the series or not. In some embodiments, if the user is not binge-watching the series, control circuitry 404 may proceed back to 708 and continue providing the series to the user device. In some embodiments, if the user is binge-watching the series, control circuitry 404 may proceed to 716.

Process 700 continues at 716, where control circuitry 404 may determine if the binge compulsion score of a next episode corresponds to a recommendation threshold. For example, control circuitry 404 may compare the binge compulsion score of a next episode (e.g., an episode that is about to play) to a recommendation threshold. In some embodiments, the recommendation threshold may be preset to a certain value (e.g., "3 episodes per 4 hours"). In some embodiments, the recommendation threshold may be dynamically adjusted by control circuitry 404. In one example, control circuitry 404 may compare the binge completion score (e.g., "3.5 episodes per 4 hours") of the next episode (e.g., episode 108 of FIG. 8) to the recommendation threshold (e.g., "3 episodes per 4 hours.") In this example, control circuitry 404 will determine that the compulsion score of the next episode does correspond to the recommendation threshold because the value "3.5 episodes per 4 hours" exceeds the threshold value "3 episodes per 4 hours." In some embodiments, if the binge compulsion score of a next episode corresponds to a recommendation threshold, control circuitry 404 may proceed to 718. In some embodiments, if the binge compulsion score of the next episode does not correspond to the recommendation threshold, control circuitry 404 may proceed to 708 and continue providing the series.

Process 700 continues at 718, where control circuitry 404 may generate for display a prompt (e.g., binge-watching prompt 114) recommending to the user to pause the series before the next episode is provided. In some embodiments, the prompt is generated in response to determining that the binge compulsion score of the next episode corresponds to the recommendation threshold at 716. In some embodiments, the prompt may be displayed on display 412. In some embodiments, the prompt may comprise an indication (e.g., text) of how many episodes the average user watched after watching the next episode.

Process 700 continues at 720, where control circuitry 404 may, in response to receiving a confirmation from the user, pause the providing of the series before the next episode is provided. For example, the user may press the "yes" pause button using a user interface input 410 to send the confirmation. In another example, the user may provide the confirmation using binge-watching UI 116. In some embodiments, control circuitry 404 may pause the playback of the series when the conformation is received.

FIG. 8 depicts an illustrative flow diagram of a process 800 for calculating an average rate of consumption in accordance with some embodiments of the disclosure. Process 800 may be executed by control circuitry 404, for example, in a manner instructed to control circuitry 404 by the media guidance application. In some embodiments, process 800 is executed as a part of block 702.

Process 800 begins at 802, wherein control circuitry 404 provides an episode of a series (e.g., episode 104 of FIG. 1)

to a plurality of user devices. For example, the media guidance application running on control circuitry 404 may generate media content for display on a plurality of displays of the plurality of users. In some embodiments, the episode may be provided to different users at different times. For example, the episode may be generated for display to each user by way of an explicit user selection to play an episode of the series.

Process 800 continues at 804, wherein control circuitry 404 determines, for each device of the plurality of user devices, a respective rate of consumption of additional sequential episodes of the series in the predetermined time period after the episode is provided. For example, one user may go on to watch 3 additional episodes after watching the episode in a 4-hour window, while another user may go on to watch two additional episodes after watching the episode in a 4-hour window. In this example, control circuitry 404 may determine the respective rate of consumption of additional sequential episodes to be "3 episodes per 4 hours" for one user and "2 episodes per 4 hours" for another user.

Process 800 continues at 806, wherein control circuitry 404 calculates an average of the respective rates of consumption. For example, in the aforementioned example, control circuitry 404 may calculate the average to be "2.5 episodes per 4 hours."

FIG. 9 depicts an illustrative flow diagram of a process 900 for setting the binge compulsion score in accordance with some embodiments of the disclosure. Process 900 may be executed by control circuitry 404, for example, in a manner instructed to control circuitry 404 by the media guidance application. In some embodiments, process 900 is executed as a part of block 702.

Process 900 begins at 902, wherein control circuitry 404 compares metadata of an episode of the series to metadata of a different episode. For example, control circuitry 404 may compare such metadata as genre, popularity on social media, actors, director or any other metadata. In some embodiments, control circuitry 404 may create a likeness score based on the comparison. For example, a better match of metadata will result in a higher likeness score.

Process 900 continues at 904, wherein control circuitry 404 retrieves a binge compulsion score of the different episode in response to determining that the likeness score corresponds to a likeness threshold. For example, if the likeness score is high enough, control circuitry 404 may retrieve the binge compulsion score of the different episode from media guidance data source 518 via communication network 514.

Process 900 continues at 906, wherein control circuitry 404 may set the binge compulsion score for the episode based on the binge compulsion score of the different episode. For example, if the binge compulsion score of the different episode is "3.5 episodes per 4 hours," control circuitry 404 may set the binge compulsion score for the episode to also be "3.5 episode per 4 hours." In some embodiments, control circuitry 404 may determine that several different episodes have a likeness score that exceeds the likeness threshold. In these embodiments, control circuitry 404 may set the binge compulsion score for the episode to be equal to an average of binge compulsion score of a plurality of different episodes that have a likeness score exceeding the threshold.

FIG. 10 depicts an illustrative flow diagram of a process 1000 for determining the user's current rate of consumption of the episodes in accordance with some embodiments of the disclosure. Process 1000 may be executed by control circuitry 404, for example, in a manner instructed to control circuitry 404 by the media guidance application. In some embodiments, process 1000 is executed as a part of block 712.

Process 1000 begins at 1002, wherein control circuitry 404 determines a binge-watching time window based on the user's profile. For example, control circuitry 404 may determine the time window based on the age of the user. For example, for users under the age of 14, control circuitry 404 may set the binge-watching window at "2 hours." In another example, for users over the age of 14, control circuitry 404 may set the binge-watching window at "3 hours." In some embodiments, any other information from the user profile may be used to set or adjust the binge-watching time window.

Process 1000 continues at 1004, wherein control circuitry 404 may determine a number of episodes of the series the user has watched during the binge-watching time window. For example, if the binge-watching window was set at "2 hours," control circuitry 404 may determine how many episodes were watched during the 2-hour window.

Process 1000 continues at 1004, wherein control circuitry 404 may divide the number of episodes determines in step 1004 by the length of the binge-watching time window. For example, if the binge-watching window was "2 hours" while the number of episodes of the series the user has watched during the binge-watching time window was "1.5," control circuitry 404 may divide 1.5 by 2 to determine the user's current rate of consumption of the episodes.

FIG. 11 depicts an illustrative flow diagram of a process 1100 for determining the binge-watching threshold in accordance with some embodiments of the disclosure. Process 1100 may be executed by control circuitry 404, for example, in a manner instructed to control circuitry 404 by the media guidance application. In some embodiments, process 1100 is executed as a part of block 713.

Process 1100 includes steps 1102, 1104, and 1106 which may be performed by control circuitry 404 sequentially or simultaneously. In some embodiments, control circuitry 404 may only perform one or two of the steps 1102, 1104, and 1106.

Process 1100 may optionally include step 1102, where control circuitry 404 accesses a user profile. For example, the user profile may be retrieved from storage 408 or from media guidance data source 518. In some embodiments, the user profile may include the user's demographic information, preferences, subscription information or any other data related to the user.

Process 1100 may optionally include step 1104, where control circuitry 404 access recent user watching history. For example, user watching history may be retrieved from storage 408 or from media guidance data source 518. In some embodiments, user watching history may include information relating to user's history of binge-watching. For example, user watching history may include an indication of how often the user has engaged in binge-watching in certain recent time period (e.g., last week).

Process 1100 may optionally include step 1106, where control circuitry 404 accesses user calendar data. For example, user calendar data may be retrieved from storage 408, from media guidance data source 518, or from user computer equipment 504. In some embodiments, user calendar data may include information relating to the user's upcoming engagements or appointments. For example, user calendar data may include an indication that the user has several meetings coming later today.

Process 1100 may continue to 1108, where control circuitry 404 may determine the binge-watching threshold based on at least one of the user profile, recent user watching history, and the user calendar data.

For example, the binge-watching threshold may be set or adjusted based on the age of the user contained in the user profile. For example, if the user is under the age of 14, control circuitry 404 may lower the recommendation threshold (e.g., by "0.5 episodes per hour.") For example, if the default binge-watching threshold is "3 episodes per 4 hours," control circuitry 404 may lower the binge-watching threshold to "2.5 episodes per 4 hours."

In some embodiments, control circuitry 404 may set or adjust the binge-watching threshold based on recent user watching history. For example, control circuitry 404 may lower the binge-watching threshold (e.g., by "1 episode per hour.") if the user engaged in certain amount of binge-watching in a certain time period (e.g., 2 instances of binge-watching over one week.) In some embodiments, control circuitry 404 may set or adjust the binge-watching threshold based on the user calendar data. For example, if the control circuitry 404 determines that the user has an upcoming apportionment or meeting in the next certain time period (e.g., in the next 4 hours) the control circuitry 404 may lower the binge-watching threshold (e.g., by "1.5 episode per hours.")

In some embodiments, control circuitry 404 may also adjust the recommendation threshold based on the data accessed in steps 1102, 1104, 1106. For example, the recommendation threshold may be adjusted based on at least one of age of the user, previous binge-watching behavior, and upcoming appointments, or any combination thereof.

In some embodiments, control circuitry 404 may also set or adjust the binge-watching threshold based parental control settings. For example, control circuitry 404 may allow the parent to explicitly set the binge-watching threshold via user input interface 410. In some embodiments, the binge-watching threshold may be set or adjusted based on activities performed by a child. For example, if the child has a lot of scheduled uncompleted activities (e.g., homework), the binge-watching threshold may be lowered by control circuitry 404.

FIG. 12 depicts an illustrative flow diagram of a process 1200 for adjusting the recommendation threshold in accordance with some embodiments of the disclosure. Process 1200 may be executed by control circuitry 404, for example, in a manner instructed to control circuitry 404 by the media guidance application. In some embodiments, process 1200 is executed as a part of block 716.

Process 1200 begins at 1202, wherein control circuitry 404 determines that a plurality of users typically paused before the next episode of the series. For example, control circuitry 404 may determine that more than a certain percentage (e.g., 25%) of users have paused the series before the playback of the next episode.

Process 1200 continues at 1204, where control circuitry 404 may adjust the recommendation threshold in response to determining that the plurality of users typically paused before the next episode of the series. For example, control circuitry 404 may lower the recommendation threshold (e.g., by "1 episode per 4 hours") if other users typically paused the series before the next episode was played.

FIG. 13 depicts an illustrative flow diagram of a process 1300 for generating for display the recommendation prompt in accordance with some embodiments of the disclosure. Process 1300 may be executed by control circuitry 404, for example, in a manner instructed to control circuitry 404 by the media guidance application. In some embodiments, process 1300 is executed as a part of block 718.

Process 1300 begins at 1302, wherein control circuitry 404 may receive, from a user, an indication that binge-watching prompts are allowed. For example, during the initial setup of user television equipment 502, the user may select an option to receive binge-watching pause recommendations. For example, the user may select this option using user input interface 410.

Process 1300 continues at 1304, where control circuitry 404 may generate for display the prompt recommending to the user to pause the series before the next episode is provided, only in response to receiving the indication that binge-watching prompts are allowed. This may be done in order not to annoy or inconvenience a user who does not wish to be warned about binge-watching.

FIG. 14 depicts an illustrative flow diagram of a process 1400 for generating for display a reminder for the user to resume watching the series in accordance with some embodiments of the disclosure. Process 1400 may be executed by control circuitry 404, for example, in a manner instructed to control circuitry 404 by the media guidance application. In some embodiments, process 1300 is executed as a part of block 718.

Process 1400 begins at 1402, wherein control circuitry 404 may calculate the length of a cool-down period based on a user profile. In some embodiments, this is done in response to pausing the providing of the series before the next episode is provided. In some embodiments, control circuitry 404 may determine the cool-down period based on demographics information (e.g., age) of the user contained in the user profile. For example, for users under 14 years of age the cool-down period may be set to 2 days, while for other users the cool-down period is set to 1 day.

Process 1400 continues at 1404, where control circuitry 404 may generate for display a reminder for the user to resume watching the series after the cool-down period. For example, control circuitry 404, may let the cool-down period (e.g., 2 days) elapse, and then generate for display (e.g., on display 100) a reminder to resume watching the series. In some embodiments, control circuitry 404 may prevent providing the series to the user before the cool-down period expires.

It is contemplated that the steps or descriptions of each of FIGS. 6-14 may be used with any other embodiment of this disclosure. It is contemplated that some steps or descriptions of each of FIGS. 6-14 may be optional and may be omitted in some embodiments. In addition, the steps and descriptions described in relation to FIGS. 6-14 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIGS. 6-14.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518.

The processes discussed above in FIGS. 6-14 are intended to be illustrative and not limiting. One skilled in the art would appreciate that the steps of the processes in FIGS. 6-14 discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
   accessing a database comprising compulsion scores for a plurality of series, each series comprising a plurality of episodes;
   determining that the database does not include a compulsion score for an episode of a first series of the plurality of series;
   determining that the database includes compulsion scores for episodes of a second series of the plurality of series;
   determining a binge compulsion score of the episode of the first series by:
      retrieving metadata of the episode of the first series;
      retrieving metadata of a an episode of the second series, wherein the episode of the second series comprises a binge compulsion score;
      determining a likeness score by comparing the metadata of the episode of the first series to the metadata of the episode of the second series;
      based on determining that the likeness score exceeds a likeness threshold:
         retrieving the binge compulsion score of the episode of the second series from the database; and
         determining the binge compulsion score of the episode of the first series based on the binge compulsion score of the episode of the second series;
   receiving a request to consume the episode of the first series; and
   based on the request and the determined binge compulsion score of the episode of the first series, displaying a notification related to the binge consumption score of the episode of the first series.

2. The method of claim 1, wherein the binge compulsion score of the episode of the first series is further based on the likeness score.

3. The method of claim 1, wherein the metadata of the episode of the first series comprises at least one of a genre identifier, an actor identifier, or a director identifier.

4. The method of claim 3, wherein the likeness score is based on at least one of a matching genre identifier, a matching actor identifier, or a matching director identifier.

5. The method of claim 1, further comprising:

retrieving metadata of a further episode of the second series, wherein the further episode comprises a binge compulsion score;

wherein the binge compulsion score of the episode of the first series is further determined based on the binge compulsion score of the further episode of the second series.

6. The method of claim 1, further comprising:

retrieving metadata of a further episode of the second series, wherein the further episode comprises a binge compulsion score;

wherein the likeness score is further determined based on the metadata of the further episode of the second series.

7. The method of claim 1, wherein the episode of the second series one of a plurality of episodes of the second series, the method further comprising:

retrieving metadata of the plurality of episodes of the second series, wherein each episode of the plurality of episodes of the second series comprises a respective binge compulsion score;

wherein the binge compulsion score of the episode of the first series is further determined based on one or more of the respective binge compulsion scores of the plurality of episodes of the second series.

8. The method of claim 7, wherein the binge compulsion score of the episode of the first series is an average of the respective binge compulsion scores of the plurality of episodes of the second series.

9. The method of claim 1, wherein the episode of the second series is one of a plurality of episodes of the second series, the method further comprising:

retrieving metadata of the plurality of episodes of the second series, wherein each episode of the plurality of episodes of the second series comprises a respective binge compulsion score;

wherein the likeness score is further determined based on the metadata of the plurality of episodes of the second series.

10. The method of claim 1, wherein the episode of the first series one of a plurality of episodes of the first series, the method further comprising:

retrieving metadata of the plurality of episodes of the first series;

wherein the likeness score is further determined based on the metadata of the plurality of episodes of the first series.

11. A system comprising:

control circuitry configured to:

access a database comprising compulsion scores for a plurality of series, each series comprising a plurality of episodes;

determine that the database does not include a compulsion score for an episode of a first series of the plurality of series;

determine that the database includes compulsion scores for episodes of a second series of the plurality of series;

retrieve metadata of the episode of the first series;

retrieve metadata of an episode of the second series, wherein the episode of the second series comprises a binge compulsion score;

determine a likeness score by comparing the metadata of the episode of the first series to the metadata of the episode of the second series;

based on determining that the likeness score exceeds a likeness threshold:

retrieve the binge compulsion score of the episode of the second series; and determine a binge compulsion score of the episode of the first series based on the binge compulsion score of the episode of the second series.

12. The system of claim 11, wherein the binge compulsion score of the episode of the first series is further based on the likeness score.

13. The system of claim 11, wherein the metadata of the episode of the first series comprises at least one of a genre identifier, an actor identifier, or a director identifier.

14. The system of claim 13, wherein the likeness score is based on at least one of a matching genre identifier, a matching actor identifier, or a matching director identifier.

15. The system of claim 11, wherein the control circuitry is further configured to:

retrieve metadata of a further episode of the second series, wherein the further episode comprises a binge compulsion score;

wherein the binge compulsion score of the episode of the first series is further determined based on the binge compulsion score of the further episode of the second series.

16. The system of claim 11, wherein the control circuitry is further configured to:

retrieve metadata of a further episode of the second series, wherein the further episode comprises a binge compulsion score;

wherein the likeness score is further determined based on the metadata of the further episode of the second series.

17. The system of claim 11, wherein the episode of the second series one of a plurality of episodes of the second series, and wherein the control circuitry is further configured to:

retrieve metadata of the plurality of episodes of the second series, wherein each episode of the plurality of episodes of the second series comprises a respective binge compulsion score;

wherein the binge compulsion score of the episode of the first series is further determined based on one or more of the respective binge compulsion scores of the plurality of episodes of the second series.

18. The system of claim 17, wherein the binge compulsion score of the episode of the first series is an average of the respective binge compulsion scores of the plurality of episodes of the second series.

19. The system of claim 11, wherein the episode of the second series one of a plurality of episodes of the second series, and wherein the control circuitry is further configured to:

retrieve metadata of the plurality of episodes of the second series, wherein each episode of the plurality of episodes of the second series comprises a respective binge compulsion score;

wherein the likeness score is further determined based on the metadata of the plurality of episodes of the second series.

20. The system of claim 11, wherein the episode of the first series one of a plurality of episodes of the first series, and wherein the control circuitry is further configured to:

retrieve metadata of the plurality of episodes of the first series;

wherein the likeness score is further determined based on the metadata of the plurality of episodes of the first series.

\* \* \* \* \*